United States Patent
Petreikis, Jr. et al.

[11] 3,901,446
[45] Aug. 26, 1975

[54] INDUCED VORTEX SWIRLER

[75] Inventors: John A. Petreikis, Jr., S. Chicago Heights, Ill.; Stanley Kreiger, Riviera Beach, Fla.

[73] Assignee: The United States of America as represented by the Secretary of the Air Force, Washington, D.C.

[22] Filed: May 9, 1974

[21] Appl. No.: 468,607

[52] U.S. Cl............. 239/132.5; 60/39.74 R; 239/406
[51] Int. Cl.²................................................ F02C 7/22
[58] Field of Search...... 239/128, 132, 132.1–132.5, 239/399, 403–406; 60/39.74 R

[56] References Cited
UNITED STATES PATENTS

| | | | |
|---|---|---|---|
| 2,602,292 | 7/1952 | Buckland et al. | 60/39.74 R |
| 3,385,055 | 5/1968 | Koblish et al. | 60/39.74 R X |
| 3,430,443 | 3/1969 | Richardson et al. | 60/39.74 R X |
| 3,498,055 | 3/1970 | Faitani et al. | 60/39.74 R X |
| 3,570,242 | 3/1971 | Leonardi et al. | 60/39.74 R |
| 3,589,127 | 6/1971 | Kenworthy et al. | 60/39.74 R X |
| 3,703,259 | 11/1972 | Sturgess et al. | 60/39.74 R X |
| 3,811,278 | 5/1974 | Taylor et al. | 239/404 X |

*Primary Examiner*—M. Henson Wood, Jr.
*Assistant Examiner*—Andres Kashnikow
*Attorney, Agent, or Firm*—Joseph E. Rusz; Jacob N. Erlich

[57] ABSTRACT

A vortex swirler for use in the combustion chamber of a gas turbine having a plurality of swirler vanes and a deflector. The swirler vanes are utilized in conjunction with the fuel nozzle of the combustion chamber in order to provide a primary mixing of fuel and air in the region of the vanes. The deflector is formed in conjunction with a plurality of apertures in order to direct air against the walls of the combustion chamber for purposes of cooling the walls.

3 Claims, 1 Drawing Figure

PATENTED AUG 26 1975 3,901,446
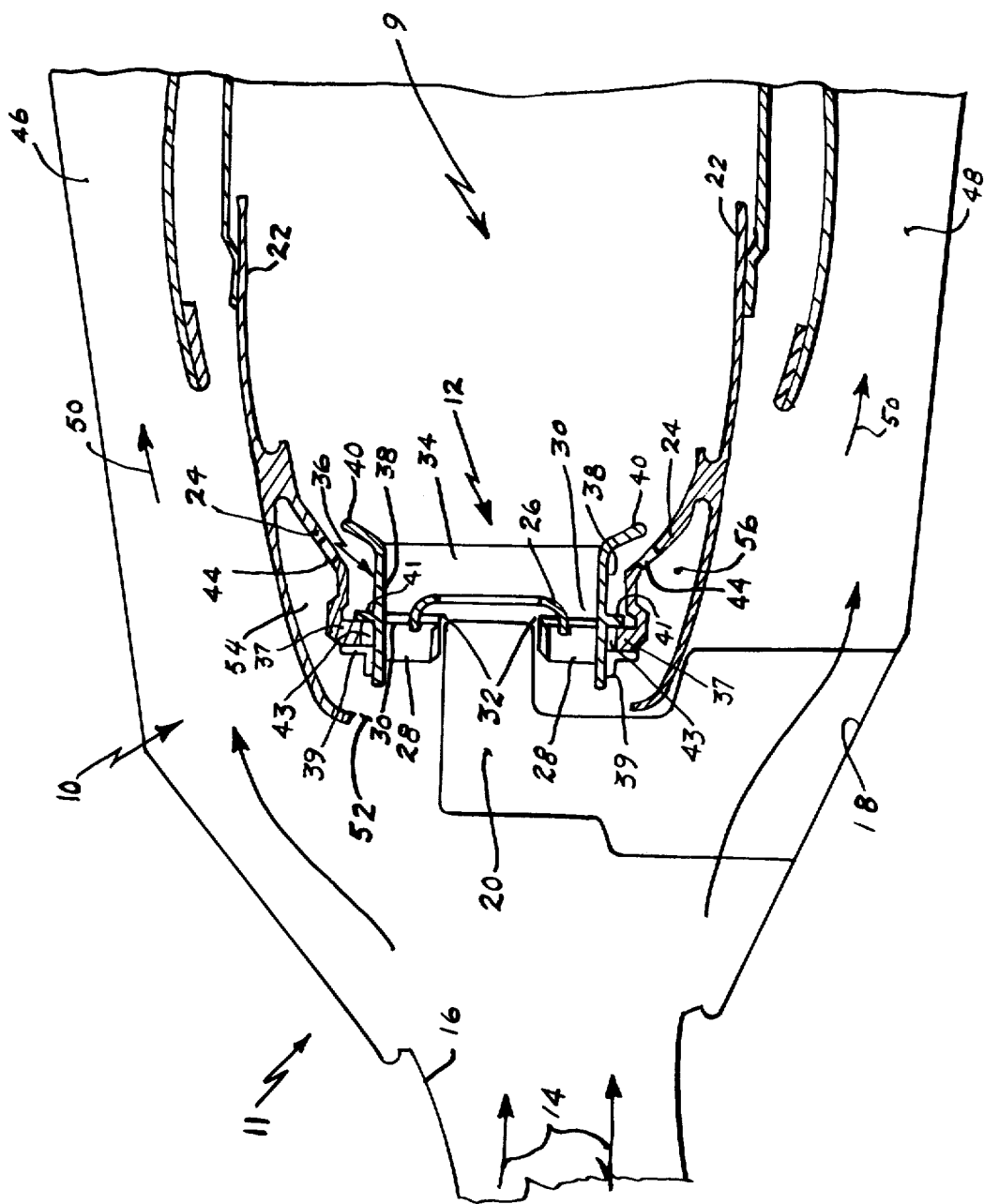

3,901,446

INDUCED VORTEX SWIRLER

BACKGROUND OF THE INVENTION

This invention relates generally to combustion chambers for gas turbine engines, and, more particularly to a means for increasing primary zone recirculation and obtaining a uniform fuel-air distribution.

Combustion chambers for gas turbines take a wide variety of shapes and forms. All contain fuel nozzles to introduce and meter the fuel to the gas stream and to atomize or break up the fuel stream for efficient combustion. Nearly all are designed for a recirculating flow condition in the region of the nozzle to develop a self-sustaining flame front in which the gas speed is lower than the flame propagation speed. In addition to being designed to burn the fuel efficiently they also uniformly mix excess air with the products of combustion to maintain a uniform turbine-inlet temperature. The combustion chamber of gas turbines must bring the gas to a controlled, uniform temperature with a minimum of impurities and a minimum loss of pressure.

SUMMARY OF THE INVENTION

This invention sets forth an induced vortex swirler which reliably and economically brings about the fuel-air mixing in the combustion chamber of gas turbine engines.

The air swirler of the instant invention is located within the combustion chamber of a gas turbine engine and surrounds the fuel nozzle with its outer wall extending downstream of the air swirl vanes and fuel nozzle exit plane to form a swirl cup or vortex cylinder. In addition the swirler is mounted in such a manner within the combustion chamber so that the swirler-nozzle combination remains concentric at all times. A deflector is located immediately downstream of the fuel nozzle exit plane and directs a portion of the swirling inlet air for mixing with the fuel and providing a film of air on the fuel nozzle face to avoid fuel decarbonization. Primary mixing of the fuel and air takes place within the swirl cup and the strong vortex flow created therein forms a strong low static pressure gradient within its center causing upstream recirculation of the combustion constituents. Film cooling of the combustion chamber dome is provided by a deflector located on the after end of the swirl cup. Cooling holes located in a wall of the combustor dome circumferentially spaced around air swirler means directs air onto the deflector for cooling the dome surface area.

It is therefore an object of the present invention to increase primary zone recirculation within a combustion chamber of a gas turbine by means of a fuel nozzle swirler element having an integral cylindrical section located immediately downstream thereof.

It is another object of the present invention to provide a swirler-nozzle combination which remains concentric regardless of the dimensional variations in the combustor dome.

It is a further object of the present invention to provide film cooling of the combustion chamber dome by means of a deflector on the aft end of the swirler element.

It is another object of the present invention to provide a vortex swirler which is highly reliable in operation, economical to produce, and which utilizes conventional, currently available components that lend themselves to standard mass producing manufacturing techniques.

For a better understanding of the present invention together with other and further objects thereof reference is made to the following description taken in connection with the accompanying drawing and its scope will be pointed out in the appended claims.

DESCRIPTION OF THE DRAWING

The only FIGURE of the drawing is a side elevational view shown partly in cross section of the combustion chamber of a gas turbine with the vortex swirler of this invention shown in position therein.

DETAILED DESCRIPTION OF THE PREFERRED EMBODIMENT

Reference is now made to the only FIGURE of the drawing which shows the combustion chamber 9 of a gas turbine engine 11 containing the vortex swirler 12 of this invention in place therein.

A compressor (not shown) located at the upstream end of gas turbine 11 discharges high pressure air as indicated by arrows 14 into the diffuser section 16 of gas turbine engine 11. Walls 18 form diffuser shroud 10 into which this high pressure air enters prior to entering combustion chamber 9. These walls 18 diverge in a downstream direction and are annular about the axis of the gas turbine engine. A fuel nozzle 20 is located in the central portion of diffuser shroud 10 and provides the fuel for combustion to take place within chamber 9. Also located within diffuser shroud 10 are inner and outer combustion chamber walls or liners 22 as well as a dome wall 24 which is utilized in conjunction with the high pressure air in a manner set forth hereinbelow.

Surrounding nozzle 20 is the vortex swirler 12 of this invention. Swirler 12 is made up of swirler vanes 28 piloted about nozzle 20 and fixedly secured to deflector plate 36 which surrounds nozzle 20. Deflector means 26 is secured to swirler vanes 28, thereby forming a pair of passageways 30 and 32 adjacent nozzle 20. Deflector plate 36 is moveably mounted upon the outer end 37 of dome wall 24 with its extensions 39 and 41 in sliding engagement with outer end 37. In this manner a space 43 is formed between outer end 37 of dome wall 24 and deflector plate 36 thereby allowing for the movement of swirler 12. Because of this free floating arrangement of swirler 12 with respect to the combustion chamber walls 22 the swirler 36 will always remain concentric with nozzle 20 regardless of the dimensional variation in the combustion chamber 9 due to thermal growth or manufacturing tolerances. The high pressure air enters tube section 34 of swirler 12 after flowing through annular swirl vane passages 30 and 32. This swirling airflow discharging from swirl passageway 32 is directed tangentially into the fuel spray cone of the pressure atomized fuel nozzle 22 to provide initial premixing penetration and to film cool the nozzle face thus eliminating coke, for example, on the nozzle face. A larger volume of swirling airflow discharging from annular swirl passageway 30 is used to provide a flammable fuel-air mixture and also to induce a large fuel-air mixture vortex so as to provide a low static pressure region near the front of the dome section 24 for recirculation of the combustion products within combustion chamber 9.

Located immediately downstream of fuel nozzle 20 is a cylindrical tube section 34 which is formed by deflector plate 36. Deflector plate 36 has a substantially straight section 38 and an extending portin 40 therein which diverges away from nozzle 20 following the contour of dome section 24. Located upstream of deflector 36 and formed adjacent the combustion chamber inner and outer walls 22 is dome 24 having a plurality of apertures 44 therein. Apertures 44 are so situated as to direct air against deflector 36 thereby redirecting this high pressure air to cool the combustion chamber dome 24.

MODE OF OPERATION

Reference is made to the only FIGURE of the drawing to show the operation of swirler 12 of this invention. Compressor discharge air as shown by arrows 14 enter the diffuser shroud 10 from the diffuser walls 16. This high pressure air enters the annular passageways 46 and 48 as shown by arrows 50.

High pressure air in the diffuser shroud 10, enters the stream of the dome 24 at point 52. The high pressure air then enters the tube section of the swirler 12 after flowing through annular swirl vane passages 30 and 32.

Swirling airflow discharging from annular swirl passageway 32 is directed tangent to the fuel spray cone of the pressure atomized fuel nozzle 20 to provide initial premixing penetration. A larger volume of swirling airflow discharging from the annular swirl passageway 30 is used to provide a flameable fuel-air mixture and also to induce a large fuel-air mixture vortex so as to provide a low static pressure region near the front of the dome section for recirculation of the combustion products within combustion chamber 9. The straight section 38 of deflector 36 is used to confine the fuel-air vortex for reduced static pressure at the fuel cone center (center of vortex).

Air from passageways 54 and 56 entering the dome at 52 flows through cooling apertures 44 and impinges upon deflector 36 of swirler 12 to provide cooling thereof. Air is then turned by the diverging section 40 of deflector 38 and caused to scrub along dome walls 24 of combustion chamber 9 to provide film cooling.

Although this invention has been described with reference to a particular embodiment, it will be understood to those skilled in the art that this invention is also capable of other embodiments within the spirit and scope of the appended claims.

We claim:

1. In a combustion chamber for a gas turbine engine having annular chamber walls and a fuel nozzle located in the central portion thereof, the improvement therein comprising a vortex swirler, said vortex swirler being positioned about and concentric with said nozzle and having an annular dome wall connected to said chamber walls, a deflector plate moveably mounted on said annular dome wall and surrounding said nozzle, a plurality of swirler vanes secured to the inner periphery of said deflector plate, inwardly directed deflector means secured to said swirler vanes thereby forming a continuous annular passage adjacent said nozzle and a plurality of apertures in said annular dome wall surrounding said deflector plate for directing air thereagainst whereby primary mixing of fuel and air take place within the region of said deflector means and film cooling of the combustion chamber and dome walls take place with air directed off said deflector plate and toward said walls, said deflector plate, swirler vanes and deflector means remaining concentric to said fuel nozzle regardless of the variation in said combustion chamber walls or mode of operation.

2. In a combustion chamber as defined in claim 1 wherein said deflector plate comprises a substantially straight section and an end portion which diverges in a direction away from said deflector means.

3. In a combustion chamber as defined in claim 2 wherein said apertures are located adjacent said deflector plate at the point where said straight section ends and said diverging portion begins.

* * * * *